United States Patent
Dumitru et al.

(10) Patent No.: US 8,584,006 B2
(45) Date of Patent: Nov. 12, 2013

(54) METHOD AND APPARATUS FOR UNIFORM PRESENTATION OF DOCUMENTS ON A MOBILE COMMUNICATION DEVICE

(75) Inventors: Dan Mihai Dumitru, Atlanta, GA (US); Rakesh Kumar Arora, Mississauga (CA)

(73) Assignee: BlackBerry Limited, Waterloo (CA)

( * ) Notice: Subject to any disclaimer, the term of this patent is extended or adjusted under 35 U.S.C. 154(b) by 167 days.

(21) Appl. No.: 12/708,670

(22) Filed: Feb. 19, 2010

(65) Prior Publication Data

US 2011/0087957 A1    Apr. 14, 2011

Related U.S. Application Data (60) Provisional application No. 61/251,469, filed on Oct. 14, 2009.

(51) Int. Cl.
*G06F 17/30* (2006.01)
(52) U.S. Cl.
USPC .......................................... 715/234; 715/273
(58) Field of Classification Search
USPC .......................... 715/234, 273; 709/206, 217
See application file for complete search history.

(56) References Cited

U.S. PATENT DOCUMENTS

| | | | | |
|---|---|---|---|---|
| 7,511,723 | B2* | 3/2009 | Sylthe et al. | 345/671 |
| 2002/0161796 | A1* | 10/2002 | Sylthe | 707/500 |
| 2004/0098461 | A1* | 5/2004 | Dennis | 709/206 |
| 2005/0108636 | A1* | 5/2005 | Sylthe et al. | 715/525 |
| 2006/0047729 | A1* | 3/2006 | Yuan et al. | 707/205 |
| 2006/0047743 | A1* | 3/2006 | Yuan et al. | 709/203 |
| 2006/0056604 | A1* | 3/2006 | Sylthe et al. | 379/100.13 |
| 2007/0050462 | A1* | 3/2007 | Dennis | 709/206 |
| 2007/0100928 | A1* | 5/2007 | Sylthe et al. | 709/200 |
| 2007/0233792 | A1* | 10/2007 | Sylthe et al. | 709/206 |
| 2008/0120360 | A1 | 5/2008 | Dumitru | |
| 2009/0043865 | A1* | 2/2009 | Dumitru et al. | 709/217 |
| 2010/0329238 | A1* | 12/2010 | Wilde et al. | 370/352 |
| 2011/0131489 | A1* | 6/2011 | Dennis | 715/273 |

FOREIGN PATENT DOCUMENTS

EP    2026258 A1    2/2009

OTHER PUBLICATIONS

EESR, EP App. No. 10154146.4; mailed Jul. 2, 2010.
RepliGo Professional 3.0 for Blackberry: "RepliGo Professional enables desktop quality viewing of email attachments such as Adobe® PDF, Microsoft® Office, WordPerfect®, OpenOffice, faxes and photos."; retrieved from http://www.cerience.com/docs/pro/index.htm; 2008.
NotifyLink for Blackberry: "These applications allow you to view attachments in their native or original file format . . . "; retrieved from http://help.notify.net/TechDocs/device/BBP/UserGuide/NetHelp/default.htm?turl=WordDocunnents%2Finstallingdynoplex attachmentsupportsoftware.htm.

* cited by examiner

*Primary Examiner* — Stephen Hong
*Assistant Examiner* — Ahamed I Nazar
(74) *Attorney, Agent, or Firm* — Novak Druce Connolly & Bove + Quigg LLP (57) ABSTRACT

A mobile communication device, comprising a display, a persistent store, at least one input device, and a processor for executing (i) an invoking application for generating a request for document data responsive to an input via the input device, (ii) an attachment viewer for receiving the request and generating a command for chunks of document data, and (iii) a listener interface for receiving a response to the command and passing the chunks to the attachment viewer for displaying respective chunks of said document data via the display.

18 Claims, 5 Drawing Sheets

METHOD AND APPARATUS FOR UNIFORM PRESENTATION OF DOCUMENTS ON A MOBILE COMMUNICATION DEVICE

CROSS-REFERENCE TO RELATED APPLICATION

This application claims priority from U.S. Provisional Patent Application No. 61/251,469, filed Oct. 14, 2009.

FIELD

The present disclosure relates to mobile communication devices, and more particularly to a method and apparatus for uniform presentation of documents on a mobile communication device irrespective of the source of the document.

BACKGROUND

It is well known in the wireless communication arts to download and display documents from a mail server using an attachment viewer application on a mobile communication device, such as a Personal Digital Assistant (PDA) or smart phone, where the documents are received as attachments to email messages. Each attachment is provided with a filename and is linked to an email message in a manner that is well known in the art. Often, a single email message may contain multiple attachments. It is also known in the art to download and view documents from a web server using a mobile device browser, or from other sources (e.g. calendar application, instant messenger (IM), etc.) However, there are differences in how the attachment viewer functions to present such documents on the mobile communication device depending on the sources of such documents.

For example, when downloading documents from a mail server it is known to send a request for 'chunks' of document data from an attachment server along with an XML command descriptor string, and to receive from the server successive binary chunks of document data along with an XML response string. By way of contrast, a mobile device attachment viewer browser plug-in does not issue requests for 'chunks' of document data, and receives a stream of document data from the server without any accompanying XML string.

Also, document data is downloaded to the attachment viewer for email attachments in constant, relatively small, chunk sizes (e.g. 16 KB) for documents and images (e.g. 64 KB), such that attachments always have the same number of data chunks for a specified chunk size, which enables a series of display features (e.g. hyperlink jump in a document, random worksheet selection, text server find, etc.), and results in quick storing and processing of the small chunk sizes. On the other hand, the attachment viewer browser plug-in receives a stream of document data that is typically limited to a larger chunk size (e.g. up to 256 Kb), resulting in a truncated version of the entire document. Partial parsing and loading is used in this case to speed up data parsing and display.

Furthermore, the attachment viewer for emails can be characterized by a persistence model that allowing saving binary data chunks and the information received in the attachment server XML responses, thereby minimizing the need for additional document requests in the event the same attachment is subsequently viewed again. According to this persistence model, the binary data chunks may be compressed (e.g. to approx. 30% of the original size) and can be backed up and restored. On the other hand, the attachment viewer for the browser does not store any binary document data since the received stream of data chunks is cached by the browser (e.g. without any compression or any XML response information from the server).

BRIEF DESCRIPTION OF THE DRAWINGS

The embodiments will be better understood with reference to the following Figures in which like numerals denote like parts and in which.

DETAILED DESCRIPTION

A method and apparatus are set forth herein for uniform presentation of documents on a mobile communication device irrespective of the source of the document (e.g. whether the source is an attachment server for email attachments, a web server, an IM server, etc.)

According to one aspect of this specification there is provided a mobile communication device, comprising a display; a persistent store; at least one input device; and a processor for executing (i) an invoking application for generating a request for document data responsive to an input via said at least one input device, (ii) an attachment viewer for receiving said request and generating a command for chunks of said document data, and (iii) a listener interface for receiving a response to said command and passing said chunks to said attachment viewer for displaying respective chunks of said document data via said display.

According to another aspect of this specification there is provided a method for uniform presentation of documents on a mobile communication device irrespective of the source of the document, comprising generating a request for document data responsive to an input to said mobile communication device; receiving said request and generating a command for chunks of said document data; and receiving a response to said command and uploading respective chunks of said document data for display on said mobile communication device.

Figure 1:
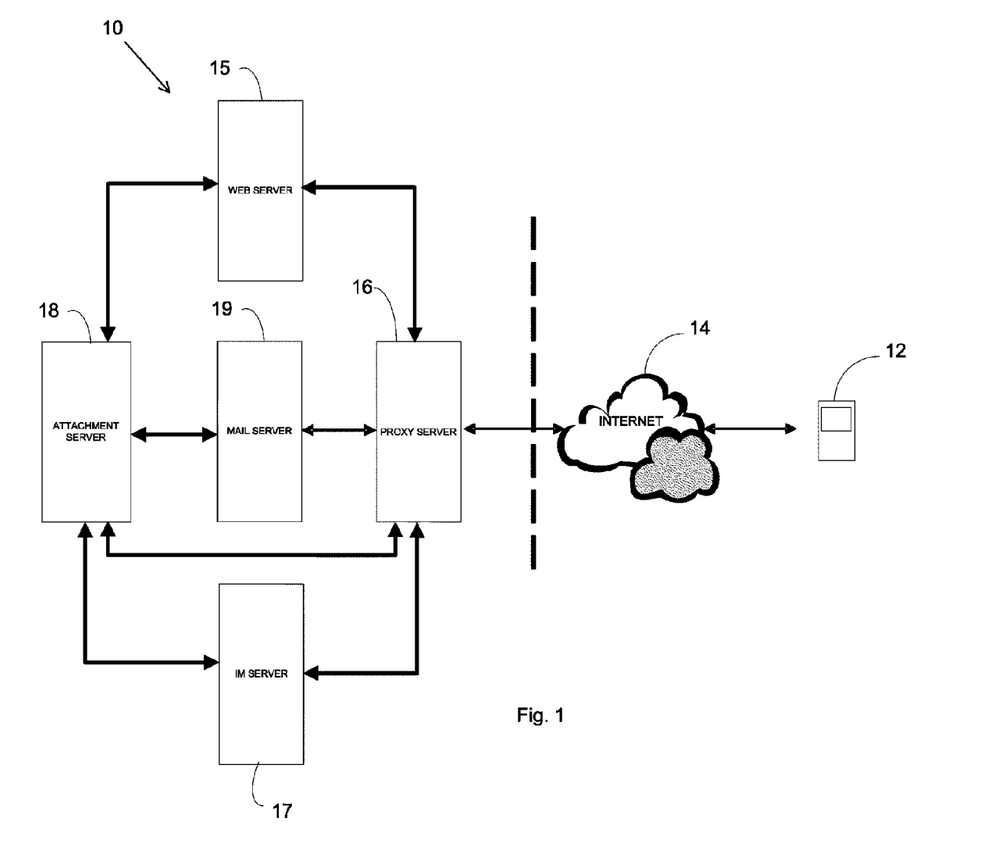
FIG. 1 is a schematic diagram of a wireless communication system.

Referring to FIG. 1, a communication system 10 for a mobile communication device 12 is generally shown. The mobile communication device 12 is operable to effect communications over a radio communications channel and communicates with a base station (not shown) while located within a coverage area that is defined by the base station. The base station is part of a wireless network that is in communication with the Internet 14, or other network such as a WAN. Data is delivered to the mobile communication device 12 via wireless transmission from the base station. Similarly, data is sent from the mobile communication device 12 via wireless transmission to the base station.

It will be appreciated that the mobile communication device 12 is movable within the coverage area and can be moved to coverage areas defined by other base stations. Further, as will be understood by one of ordinary skill in the art, wireless networks include GSM/GPRS, CDPD, TDMA, iDEN, Mobitex, DataTAC networks, EDGE, EVDO or UMTS and broadband networks such as Bluetooth and variants of 802.11.

A proxy server 16 handles client requests from the mobile communication device 12 for documents stored within an attachment server 18. The attachment server 18 communicates with the proxy server 16 to transmit attachments such as documents, spreadsheets, images, multimedia files, etc. for viewing via an attachment viewer of the mobile communication device 12 to allow a user to view attachments that are received in email messages. While only one server 18 is shown for illustration purposes, a person skilled in the art will understand that the attachment server 18 may alternatively be a network of attachment servers. Sources for the attachments stored within server 18 may include a web server 15, mail server 19, IM server 17, etc. Preferably the document data is downloaded to mobile communication device 12 in chunks of binary data in an attachment viewer readable format, for example Universal Content Stream (UCS) format.

One aspect of this specification addresses methods and apparatus implemented on the mobile communication device 12 and another aspect of this specification addresses methods and apparatus implemented on the proxy server 16 for uniform presentation of documents on the device 12.

Figure 2:
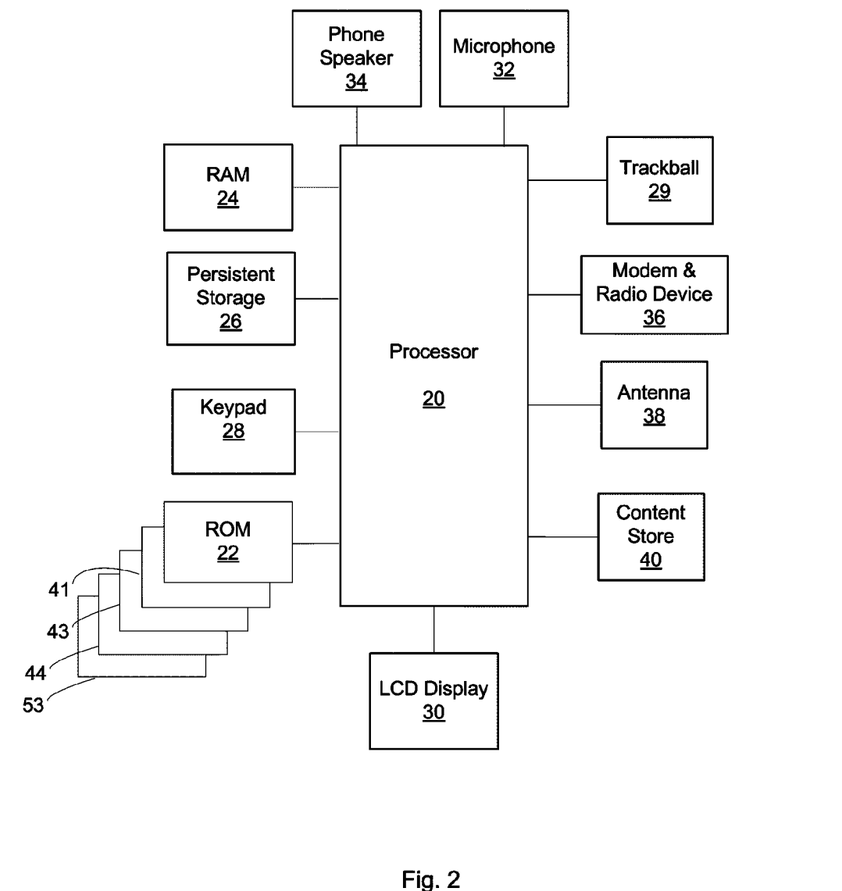
FIG. 2 is a block diagram of components of a mobile communication device according to an embodiment.

Referring now to FIG. 2, a block diagram of certain components within the mobile communication device 12 is shown. In the present embodiment, the mobile communication device 12 is based on the computing environment and functionality of a wireless personal digital assistant (PDA). It will be understood, however, that the mobile communication device 12 is not limited to wireless personal digital assistants. Other mobile communication devices are possible, such as smart telephones, and laptop computers.

The mobile communication device 12 includes a processor 20 connected to a read-only-memory (ROM) 22 that contains a plurality of applications executable by the processor 20 that enables the mobile communication device 12 to perform certain functions including, for example, an invoking application 41 (e.g. instant messaging (IM), calendaring, email messaging, web browser), an attachment viewer 43 for viewing documents received from the attachment server 18, web server 17 and IM server 19, a listener interface 44, and a callback interface 53, discussed in greater detail below, and other functions such as cellular telephony, memo pad, calculator, etc.

As discussed in greater detail below, the attachment viewer includes a user interface to accept user actions when viewing documents from the web browser, instant messaging application (e.g. to enhance image for specific resolution, view embedded object, switch to text/image, etc).

Also as discussed below, a common architecture is defined for attachment viewer invocation from different applications (e.g. calendar, browser, instant messenger, messaging application, etc.), and an attachment viewer callback interface is provided for the application that invokes the attachment viewer to be notified when user actions are selected.

The processor 20 is also connected to a random access memory unit (RAM) 24 and a persistent storage device 26, which are responsible for various storage functions of the mobile communication device 12. The processor 20 receives input from input devices such as a keypad 28 and trackball 29 (or other input device such as a touchpad, touch screen, etc.). The processor 20 outputs to various output devices, such as an LCD display 30. A microphone 32 and phone speaker 34 are connected to the processor 20 for cellular telephone functions. The processor 20 is also connected to a modem and radio device 36. The modem and radio device 36 is used to connect to wireless networks and transmit and receive voice and data communications through an antenna 38. A content store 40, which is generally a file storage system for the mobile communication device 12, is also provided.

Figure 3:
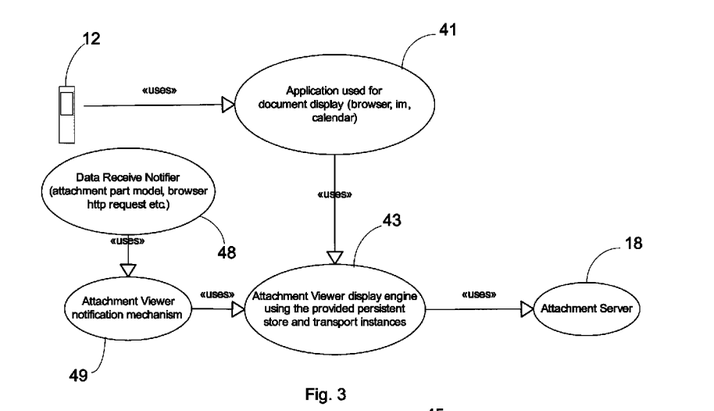
FIG. 3 is a unified modeling language (UML) diagram showing communication between an invoking application, attachment viewer and attachment server of the communication system of FIG. 1 for downloading data to the mobile communication device of FIG. 2.

As shown in the UML diagram of FIG. 3 upon receipt of a user request 40 for a document, the calling application 41 uses (42) an attachment viewer display engine 43 which in turn uses the persistent store 26 to display and store content from attachment server 18. Requests for content data are made by the proxy server 16 to attachment server 18 by passing an XML string in the body of the request, as discussed in greater detail below with reference to FIGS. 5 and 6. In the event that the server response string indicates that the document has been stored in cache memory (e.g. persistent storage 26), there is no need to download the document from the original URL location.

As discussed in greater detail below, the attachment viewer includes a user interface, which accepts user actions for enhanced image data request, retrieval of an embedded object or the textual data for rendered slides/pages, etc.

Figure 4:
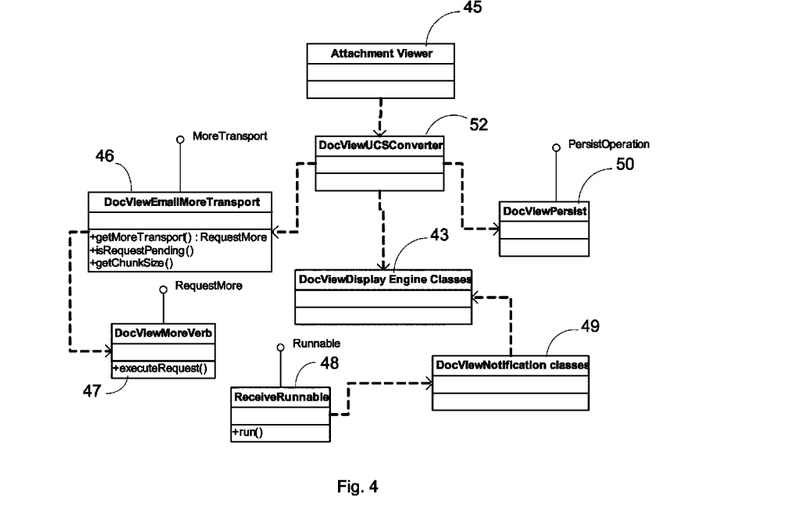
FIG. 4 is a class diagram of an attachment viewer of the mobile communication device of FIG. 2, according to an embodiment.

Turning to the class diagram of FIG. 4, in conjunction with FIG. 3, if the document data is not found in the persistent store 26, the attachment viewer 45 public classes are used to issue the command or request for the initial document data chunk (e.g. a More command or a RequestMore command issued by interfaces 46 and 47, respectively). A viewer callback interface 48 is provided for the invoking application 41 to be notified when user actions are selected. Attachment viewer meta-data is maintained and passed to the notified object for inclusion in subsequent requests to the proxy server 16. This provides the invoking application 41 with the ability to issue new data and update the display 30. Interface 48 uses attachment viewer response mechanism 49 to process responses from the attachment server 18. However, alternative configurations are possible, for example if the invoking application 41 (e.g. browser) is actually invoked only after the initial data has been retrieved from the attachment server 18. In this case it is the proxy server 16 that issues the initial data request.

The attachment viewer display engine 43 is invoked using a plug-in to the calling application. Application specific implementations of the persistence and transport interfaces 46, 47 and 50, are passed to the display engine 43 using rendering options of the plug-in architecture. Display engine 43 renders the existing data in a consistent manner, makes data requests based on user input and is notified when data is received from the server to update the display 30.

While the MoreTransport interface implementations 46 or 47 are optional, the PersistOperation (50) must be valid when the display field is constructed, otherwise no data can be displayed. However, it is not required that the persistence store 26 exist a reset of the device 12. For example, the persistent store can be session based and constructed in memory when document data chunks for a linked document are displayed (e.g. in the browser).

PersistOperation implementation ensures that document data received from attachment server 18 via the available transport 46 or 47 is cached and retrieved in a similar manner and that the display engine 43 retrieves the data in a unified way. There are three generic keys used in accessing an atomic attachment in the persistent store 26 (int or long—message id for email, int or long—more part id for email, archive indicator—string indicating the archive index for a document in an archive). These values are used to initialize the display engine 43 and can have a different meaning for each calling application (e.g. a hash code for the downloaded url) or can be generic (except for the archive indicator which has a predefined meaning). These values are also used to route a received data response to the active display engine 43 displaying the particular document.

MoreTransport implementation provides the mechanism for sending a request for data to the attachment server 18. The transport media can be email MORE, HTTP request etc. Common constraints for the MoreTransport implementation include that it accept and transport to the attachment server 18 an XML string descriptor and that it is able to receive an XML descriptor from the attachment server together with the binary data chunk.

DocViewUCSConverter 52 is a class used by the attachment viewer 45 in an embodiment, to register when the device 12 boots (i.e. starts or resets) so that it understands the MIME type "UCS". Thus, every binary data with this MIME type (a file with extension ucs or binary data in memory coming from a data connection with UCS MIME type) is routed through the attachment viewer architecture.

In addition to configuring the attachment viewer for uniform presentation of documents, as discussed above with reference to FIGS. 3 and 4, the invoking application 41 must also be appropriately configured. For example, where the invoking application 41 is a browser a listener interface 44 may be implemented for communicating with callback interface 48, and the browser should be configured to make appropriate HTTP requests to the proxy server 16 (i.e. by constructing a request header, setting cmd, etc). When the server response has been received, the browser is configured to pass the data to the attachment viewer and update the display 30 (i.e. a referrer parameter is notified via DocView Notification classes 49). This 'referrer' is an intermediate class connected with the document viewer display classes 43. Likewise, where the invoking application 41 is an instant messaging application, a further listener interface 44 may be implemented and the IM application should be configured to make appropriate IM requests to the proxy server 16 (i.e. by setting IM fields, etc). Also, where the invoking application 41 is an email client the aforenoted listening interface is used and the client is configured to make the appropriate emails requests to the proxy server 16.

Figure 5:
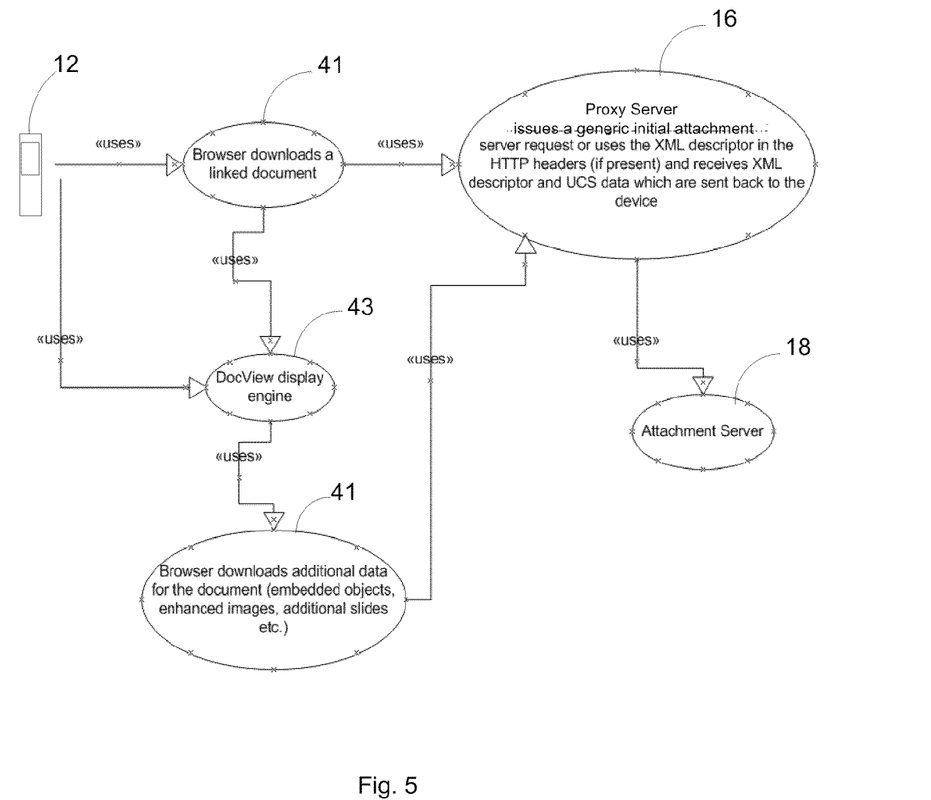
FIG. 5 is a unified modeling language (UML) diagram showing communication between a browser, attachment viewer and attachment server of the communication system of FIG. 1 for downloading data to the mobile communication device of FIG. 2.
Figure 6:
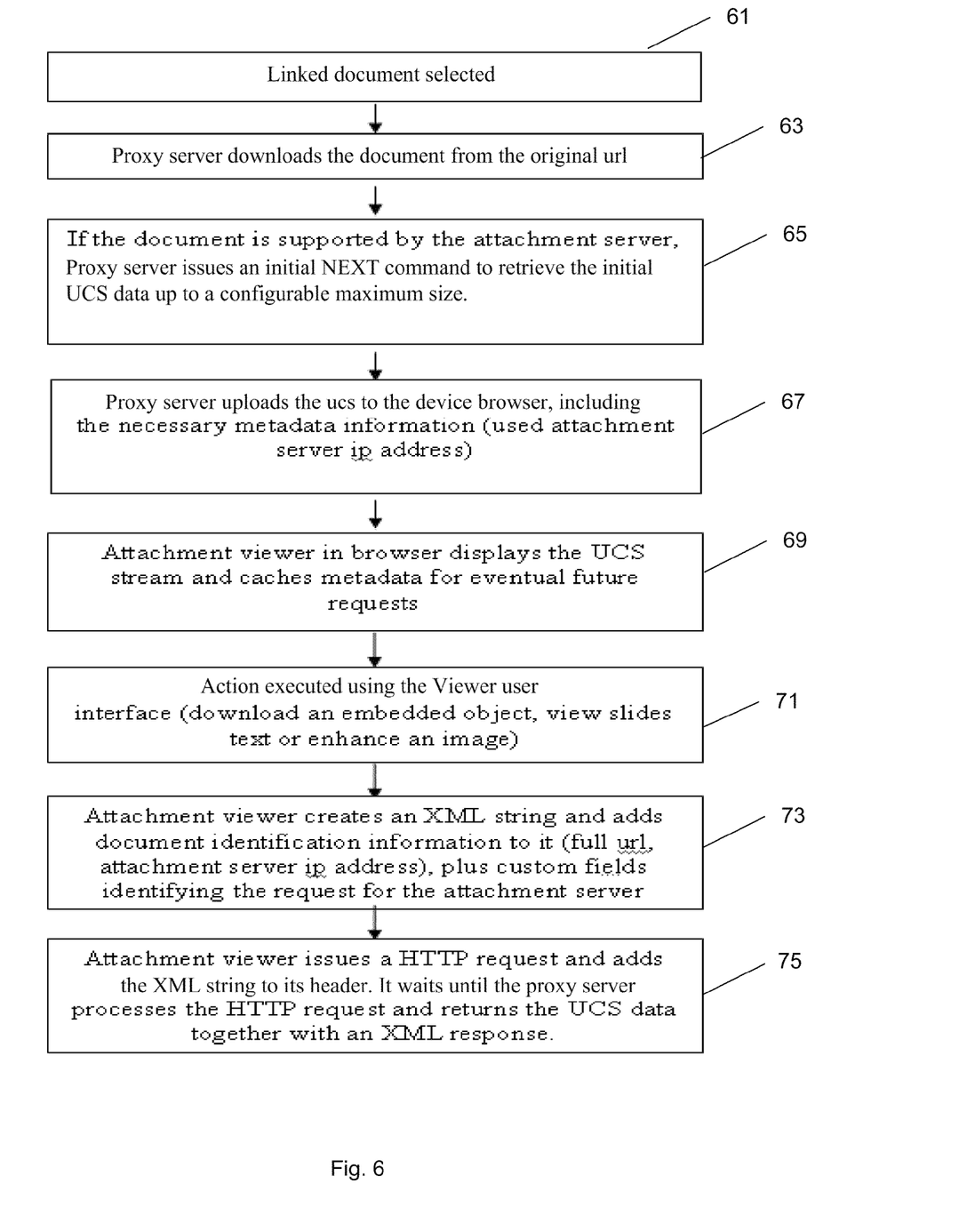
FIG. 6 is a flowchart showing server-side operation of a method for downloading data to an attachment viewer of the mobile communication device of FIG. 2.

Turning now to FIGS. 5 and 6, operation of the proxy server 16 is described for downloading attachment server supported files using the device browser. In response to selection of a linked document 61, the browser uses the proxy server 16 to download (63) the document from the attachment server 18. More particularly, proxy server 16 analyses the linked file extension and provided that the document is of a type that is supported by the attachment server 18, issues a command to the attachment server 18. The command may be a generic initial attachment server request, or may use the XML descriptor in the HTTP headers to download the document from the attachment server 18. The proxy server 16 preferably issues the command to the server 18 after adding an MD5 encryption hash function, Origin Key, and XML tags, etc.

This functionality is implemented in the attachment viewer 45 by allowing it to open a browser channel for document data communication and thereby make data requests.

If the requested document is of a type that is supported by attachment server 18, the resulting XML response and binary document data are sent back (67) to the device browser 45 via HTTP. The metadata information contains the initial XML attachment server response, as well. The XML response string is part of the HTTP headers for the particular request and it is accessible using a predefined property. The binary document data is sent to the device using a predefined content type (e.g. Universal Content Stream (UCS)).

The attachment viewer 43 detects this content type and is able to display (69) the initial data by using the input XML string and the binary data. The attachment viewer 45 sends such requests based on user input by adding the XML string to the HTTP headers property and issuing a GET HTTP request using the document download url. Proxy server 16 searches for the specific property in the HTTP request header and, if encountered, determines that the request is an attachment server request. Upon receiving the response from attachment server 18, proxy server 16 packages the XML descriptor in the http headers and sends it back to the device 12 together with the response binary document data. It should be noted that the XML string descriptor is not always the same; it is manipulated by attachment viewer 45 and server 16 by adhering to a predefined protocol. A correspondence between the initial proxy request and the attachment server ip address should be in place in order to access the attachment server cache for subsequent requests from the device 12, and thereby eliminate the need for multiple downloads of the linked document from the web server 15.

In response to execution of an action (71) using the interface (46), such as to download an embedded object, view slides text, enhance image, etc.), the attachment viewer creates (73) an XML string and adds the document ID to it (e.g. full url, attachment server IP address, etc.) as well as fields for identifying the request for the attachment server 18, sends (75) the request to the proxy server 16, and awaits response from the proxy server 16. The proxy server 16 adjusts the attachment server response to create a response XML string.

The following is an example XML string sent to the attachment viewer 45 upon the initial download of the linked document and display in the browser (note that the XML tags set forth below may not, in practice, be exactly as indicated (for example, extra tags are set forth and the <SIP> and <URL> tags are processed by proxy server 16 but never reach the attachment viewer 45):

```
<BBASCMD>
    <CR>
        <FT>0.4</FT> // file type as returned by the attachment server to the
    MDS as response to the NEXT command
        <URL>document url</URL> // document full path
        <SIP>10.144.10.45</SIP> // used attachment server ip address
    </CR>
</BBASCMD>
```

The following is an example XML request added by the attachment viewer 45 to the HTTP request for the case of retrieving an embedded object:

```
<BBASCMD>
    <CD>NEXT</CD>
    <CP>
        <PARTIDX>999</PARTIDX> // Full Content part index
        <DOMID>i0\i99</DOMID> // unique dom ID for the embedded
    object
```

```
        <URL>document url</URL> // document full path
        <SIP>10.144.10.45</SIP> // attachment server ip address to use
    </CP>
</BBASCMD>
```

The following is an example response XML string retrieved from the HTTP response:

```
<BBASCMD>
    <CR>
        <PARTIDX>999</PARTIDX> // requested part index
        <DOMID>i0\i99</DOMID> // unique dom ID for the embedded
        object
        <ERRNO>0</ERRNO> // 0 if no error, error value otherwise
        <URL>document url</URL> // document full path
        <SIP>10.144.10.45</SIP> // attachment server ip address used
    </CR>
</BBASCMD>
```

The following is an example XML request sent by the attachment viewer 45 for enhancing a slide/page:

```
<BBASCMD>
    <CD>RENDER</CD>
    <CP>
        <PARTIDX>1003</PARTIDX> // request part index for enhance
        <SArDOMID>i0</SArDOMID> // slide/page dom ID to enhance
        <DI>853x640x16</DI> // desired pixel size and color depth after
        enhance operation
        <IRD>0x0x960x720</IRD> // desired rectangle to be enhanced
        (source coordinates)
        <URL>document url</URL> // document full path
        <SIP>10.144.10.45</SIP> // attachment server ip address to use
    </CP>
</BBASCMD>
```

The following is an example response XML string:

```
<BBASCMD>
    <CR>
        <PARTIDX>1003</PARTIDX> // enhance part index
        <IRD>0x0x960x720</IRD> // page rectangle enhanced in source
        coordinates
        <ERRNO>0</ERRNO> // 0 if no error, error value otherwise
        <SArDOMIDs>i0,</SArDOMIDs> // slide domID for which the
        requested response is for
    </CR>
</BBASCMD>
```

The following is an example XML request for text of a ppt/pdf document that has already been rendered:

```
<BBASCMD>
    <CD>NEXT</CD>
    <CP>
        <PARTIDX>999</PARTIDX> // request Full Content for main
        document
    </CP>
</BBASCMD>
```

The following is an example response XML string:

```
<BBASCMD>
    <CR>
        <PARTIDX>999</PARTIDX> // Full Content part index
        <ERRNO>0</ERRNO> // 0 if no error, error value otherwise
    </CR>
</BBASCMD>
```

Additional implementation aspects are as follows:

The web server 15 preferably populates HTTP responses with attachment viewer meta-data (i.e. ip used, url, etc) obtained from the attachment server 18, and accepts attachment viewer meta-data if present in the HTTP request header. (i.e. server ip to use, part, dom id, etc) and passes this information to the attachment server 18.

IM server 17 is configured to support responding with attachment server meta-data by accepting attachment server meta-data and using it during transcoding (i.e. server ip, part, dom id, etc).

Other device application modifications may be implemented, as follows:

A FileExplorer application on the device 12 may be configured to provide a "View" verb in the display menu if the file extension matches one of a plurality of supported file extensions (doc, xls, pdf etc.) When the "View" menu item is selected, the File Explorer application (or a plugin) contacts the proxy server 16 in a similar way as the browser plugin in order to create a transmission channel, whereupon the attachment server 18 converts the file to a viewer-readable format (e.g. UCS) for downloading to the device 12 via proxy server 16. The attachment viewer 45 is preferably invoked immediately after the document data starts to be downloaded. It will be understood that the attachment viewer application 45 registers itself as a File Explorer plugin for the viewer-readable format (e.g. UCS).

As discussed above, the persistence model for the attachment viewer plug-in to the mobile device browser is configured so as not to rely on the initial data cached by the browser and to generate only the minimum number of wireless requests required for viewing a previously downloaded document. Also, by aligning the functionality of the attachment viewer 45 for both email and browser document viewing, additional advantages may be realized such as the document data chunks being part of low memory manager implementation on the device 12 and the ability to backup and restore document data.

A specific embodiment has been shown and described herein. However, modifications and variations may occur to those skilled in the art. All such modifications and variations are believed to be within the sphere and scope of the present embodiment.

What is claimed is:

1. A mobile communication device, comprising:
   a display;
   a persistent store for storing an invoking application, an attachment viewer, a listener interface, and an attachment viewer callback interface;
   at least one input device; and
   a processor for executing said invoking application for generating a request for document data responsive to an input via said at least one input device;
   said processor further configured to execute said attachment viewer in response to said request generated by said invoking application, for generating a command for chunks of said document data;

said processor further configured to execute said listener interface for receiving a response to said command and passing said chunks to said attachment viewer for displaying respective chunks of said document data via said display; and said processor further configured to execute said attachment viewer callback interface for notifying said invoking application of a further input received by the attachment viewer for manipulating said displayed chunks and for passing meta-data relating to said document data to said invoking application for saving along with said document data in said persistent store to facilitate subsequent document data requests.

2. The mobile communication device of claim 1, wherein said attachment viewer is embedded into a container of said invoking application as a plug-in and uses public classes for generating said command.

3. The mobile communication device of claim 1, wherein said invoking application checks said persistent store for document data prior to invoking said attachment viewer to generate said request.

4. The mobile communication device of claim 1, wherein said invoking application is one of a browser, calendar application or instant messaging application.

5. The mobile communication device of claim 1, wherein said attachment viewer callback interface uses an attachment viewer response mechanism to process said response.

6. The mobile communication device of claim 2, wherein application specific implementations of persistence and transport interfaces are passed to said attachment viewer using rendering options of said plug-in.

7. The mobile communication device of claim 1, wherein said persistent store is session based and is constructed upon display of said chunks of document data.

8. The mobile communication device of claim 1, wherein said processor uses a key for saving said document data in said persistent store and for routing said response to said attachment viewer.

9. The mobile communication device of claim 8, wherein said key is an identifier of a document attachment to an email.

10. The mobile communication device of claim 8, wherein said key is an email identifier.

11. The mobile communication device of claim 8, wherein said key is an archive indicator string for indicating an archive index of a document.

12. The mobile communication device of claim 1, wherein said command comprises an HTTP request for said document data, said request having an XML descriptor added to headers of the HTTP request for identifying the request and said document data.

13. The mobile communication device of claim 12, wherein said response includes said XML descriptor along with document binary data representing said chunks of said document data.

14. The mobile communication device of claim 12, wherein said meta-data includes at least one of a full document URL, document DOM ID, and a server IP address.

15. The mobile communication device of claim 1, wherein said chunks of document data said conform to a predetermined content type.

16. The mobile communication device of claim 15, wherein said predetermined content type is Universal Content Stream (UCS).

17. A method for uniform presentation of documents on a mobile communication device irrespective of the source of the document, comprising:

storing an invoking application, an attachment viewer, a listener interface, and an attachment viewer callback interface in a persistent store;

generating, via execution of said invoking application, a request for document data responsive to an input to said mobile communication device;

receiving said request and generating, via execution of said attachment viewer, a command for chunks of said document data;

receiving, via execution of said listener interface, a response to said command and uploading respective chunks of said document data for display on said mobile communication device; and executing said attachment viewer callback interface for notifying said invoking application of a further input received by the attachment viewer for manipulating said displayed chunks and for receiving and saving meta-data relating to said document data along with said document data in a persistent data store to facilitate subsequent document data requests.

18. The method of claim 17, wherein said command comprises an HTTP request for said document data, said request having an XML descriptor added to headers of the HTTP request for identifying the request and said document data.

* * * * *